United States Patent [19]
Porter

[11] Patent Number: 6,148,535
[45] Date of Patent: *Nov. 21, 2000

[54] GAS DRYER

[75] Inventor: David Porter, Newcastle-on-Tyne, United Kingdom

[73] Assignee: Domnick Hunter Limited, Birtley, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/107,061

[22] Filed: Jun. 30, 1998

[30] Foreign Application Priority Data

Jul. 19, 1997 [GB] United Kingdom .................. 9715155

[51] Int. Cl.⁷ .................................................. F26B 21/06
[52] U.S. Cl. ............................................. 34/80; 55/347
[58] Field of Search .............................. 34/335, 336, 416, 34/472, 79, 80; 55/337, 347, 348; 96/166, 209; 95/260, 261; 62/85, 195, 292, 475

[56] References Cited

U.S. PATENT DOCUMENTS

| | | | |
|---|---|---|---|
| 4,071,337 | 1/1978 | Evans | 55/212 |
| 4,124,528 | 11/1978 | Modell | 252/411 R |
| 4,361,425 | 11/1982 | Hata | 55/218 |
| 4,405,343 | 9/1983 | Othmer | 55/28 |
| 4,468,239 | 8/1984 | Frantz | 55/162 |
| 4,552,570 | 11/1985 | Gravatt | 55/20 |
| 4,572,725 | 2/1986 | Kojima | 55/274 |
| 4,591,367 | 5/1986 | Pek et al. | 55/344 |
| 4,963,168 | 10/1990 | Spencer | 55/180 |
| 5,313,805 | 5/1994 | Blackmon et al. | 62/195 |
| 5,512,088 | 4/1996 | McKenzie | 96/152 |
| 5,525,133 | 6/1996 | Haukeness | 55/307 |

FOREIGN PATENT DOCUMENTS

| | | | |
|---|---|---|---|
| 0 714 689 A2 | 6/1996 | European Pat. Off. | |
| 2 104 795 | 7/1972 | Germany . | |
| 1136052 | 4/1966 | United Kingdom . | |
| WO86/01165 | 2/1986 | WIPO | 53/26 |

*Primary Examiner*—Stephen Gravini
*Attorney, Agent, or Firm*—Workman, Nydegger & Seeley

[57] ABSTRACT

A gas dryer comprises a chamber with an inlet and an outlet for a gas which is to be dried by flowing under pressure through the dryer. The chamber is arranged so that the direction of flow of the gas is between its end faces. The location of the inlet and the outlet for gas to be dried are such that, when the chamber is mounted so that the direction of flow of gas between the inlet and the outlet is off the vertical, neither the inlet nor the outlet is arranged centrally at the low point of the chamber. The dryer includes a medium in the chamber for adsorbing liquid entrained with the gas. A drain tube extends from the low point region of the chamber at which liquid can collect when the dryer is mounted for use off the vertical into a depressurization outlet through which gas leaves the chamber when the dryer is depressurized. Liquid which has collected in the low region of the chamber is discharged into the depressurization outlet.

13 Claims, 1 Drawing Sheet

GAS DRYER

BACKGROUND TO THE INVENTION

1. The Field of the Invention

This invention relates to a gas dryer such as might be used to remove liquids that are entrained in a compressed gas system. It might find particular application in the removal of water from a compressed air system.

2. Present State of the Art

Systems commonly used for removing adsorbable fluids from compressed gas systems use an adsorbent for the fluid in a vertically arranged chamber through which the gas is passed upwardly under pressure. Such fluids might be present in the gas system in the gas phase, for example as a vapor (which can often be easily condensed) or as a liquid, for example in droplets as in the form of an aerosol. Frequently, two such chambers are arranged in parallel. While one of the chambers is in use, the other can be recharged for use by passing a purge gas stream through it to remove adsorbed liquid.

In some applications, a dryer might be mounted in a space which is too small for the chamber to be mounted vertically. It might then be mounted at an angle to the horizontal or, more commonly, substantially horizontally. When mounted horizontally, a conventional dryer designed for use when arranged vertically can function satisfactorily initially. However, any liquid that drains into the chamber from the adsorbent cannot escape from the chamber via the outlet for the purge gas when, as is customarily the case, the purge gas outlet is mounted towards the center the end wall of the chamber (which would be the base if the dryer were mounted vertically). Instead, liquid can tend to collect in a low point of the chamber. Failure to remove the liquid will reduce the effectiveness of the adsorbent when next used.

SUMMARY OF THE INVENTION

The present invention incorporates a drain tube in the chamber of a gas dryer through which any liquid that has collected in the chamber is discharged into a depressurisation outlet. The depressurisation outlet will usually be the outlet for purge gas which is used to regenerate adsorbent material in the chamber.

Accordingly, in one aspect, the invention provides a gas dryer which comprises:

(a) a chamber with an inlet and an outlet for a gas which is to be dried by flowing under pressure through the dryer, arranged so that the direction of flow of the gas is between end faces of the chamber, the location of the inlet and the outlet for gas to be dried being such that, when the chamber is mounted so that the direction of flow of gas between the inlet and the outlet is off the vertical, neither the inlet nor the outlet is arranged centrally at the low point of the chamber, (b) a medium in the chamber for adsorbing liquid entrained with the gas, and (c) a drain tube which extends from the low point region of the chamber at which liquid can collect when the dryer is mounted for use off the vertical into a depressurisation outlet through which gas leaves the chamber when the dryer is depressurised so that liquid which has collected in the said region of the chamber is discharged into the depressurisation outlet.

The dryer of the present invention has the advantage of allowing liquid that has collected in a dryer to be drained from the adsorbent chamber conveniently. This means that the adsorbent medium can be purged of adsorbed liquid effectively for re-use. In particular, the dryer of the invention enables liquid that has collected in the adsorbent chamber to be drained automatically when the adsorbing medium in the chamber is purged of adsorbed liquid. Liquid drainage need not involve a valve in the adsorbent chamber. Purging of liquid from the adsorbent chamber in the dryer of the invention can therefore be achieved effectively and reliably compared with existing dryers, even when mounted horizontally.

A particular advantage of the dryer of the invention is that recharging of an adsorbent can be achieved reliably even when neither the inlet nor the outlet for the gas to be dried is arranged centrally at the low point of the dryer, such as in the case of a dryer mounted off the vertical, especially substantially horizontally, in which the inlet and the outlet for the gas are located centrally in the end walls of the chamber. A dryer might be arranged off the vertical, especially horizontally, when there is insufficient space for it to be mounted vertically. The ability of the dryer of the invention to provide reliable and effective drainage of collected liquid can be a particular advantage for such applications where restrictions on space can make access to the dryer for maintenance or service difficult.

The dryer can include means for mounting the chamber for use, arranged so that liquid collects preferentially in the region of the chamber from which it can be drained through the drain tube when the chamber is depressurised. The mounting means is preferably arranged so that the direction of flow of the gas is at an angle of at least about 20° to the vertical, more preferably at least about 45°, especially at least about 60°, for example at least about 75°. For many applications, the mounting means will be arranged so that the direction of flow of the gas is substantially horizontal.

Generally, the outlet for gas when the chamber is depressurised will be adjacent to or otherwise in the vicinity of the inlet for gas to be dried when the dryer is in use. Liquid that has collected in the chamber is therefore drawn into the depressurisation outlet when the chamber is depressurised together with liquid that is desorbed from the adsorbent when the chamber is depressurised. This enables any liquid that is discharged from the chamber to be discharged using an operating technique that is similar or identical to that used conventionally with vertically arranged dryers.

It is envisaged that the outlet for pressurised gas might be arranged in other ways. For example, the pressurised gas might be discharged from the chamber through the inlet for gas that is supplied to be dried. In this arrangement, the drain tube for collected liquid will extend from the low point of the chamber into the gas inlet. Liquid that has collected in the chamber is therefore drawn into the gas inlet which then functions as the depressurisation outlet when the chamber is depressurised together with liquid that is desorbed from the adsorbent when the chamber is depressurised. A valve might be located at a low point in the gas inlet to allow drainage of collected liquid, generally with venting of the purge gas.

Recharging of the adsorbent in the chamber might be achieved by passage through the chamber of a purge gas, generally in a direction that is opposite to the direction of flow from the gas inlet to the gas outlet of gas that is to be dried. Depressurisation of the dryer leading to the discharge of collected liquid generally involves stopping the flow through the chamber of the gas that is to be dried. When there is a pressurisation outlet that is separate from the gas inlet, the gas inlet will be closed prior to the depressurisation. The discharge of the liquid will take place on initial depressurisation; it might also accompany subsequent passage of a purge gas through the chamber. The pressure in the chamber prior to stopping the flow of the gas that is to be dried might be at least about 0.4 MPa absolute, preferably at least about 0.6 MPa, more preferably at least about 0.8 MPa. The pressure will generally be not more than about 2.5 MPa, preferably not more than about 1.5 MPa. The pressure change will generally be substantially to atmospheric pressure. The pressure change will generally be at least about 0.3 MPa, preferably at least about 0.5 MPa. The pressure change will generally be arranged to take place over a period of not more than about 15 s, preferably not more than about 10 s, more preferably not more than about 5 s. The rate of the pressure drop will generally be arranged to be at least about 25 $kPa.s^{-1}$, preferably at least about 50 $kPa.s^{-1}$, more preferably at least about 75 $kPa.s^{-1}$, for example at least about 120 $kPa.s^{-1}$. Liquid that has collected in the chamber can be arranged to be drained for at least about 50% of the period during which pressure in the chamber drops, preferably at least about 65%, more preferably at least about 75%, ideally at least about 85% of the period. The period in which the liquid is discharged will generally be when depressurisation of the chamber occurs most rapidly.

The quantity of liquid that might be removed from the chamber of a dryer according to the invention might be in the range from about 0.1 $cm^3$ to about 10 $cm^3$, and possibly up to about 100 $cm^3$ for larger dryers.

The dryer of the invention may include a second chamber with adsorbent medium in it (and possibly further such chambers), connected in parallel so that the chambers can be operated in sequence with gas to be dried flowing from the gas inlet to the gas outlet of one chamber while the other chamber is purged of adsorbed fluid and any collected liquid. Appropriate connections for such plural chambers are known from dryer and other adsorbent apparatus which operate in this cyclical way.

The adsorbent in the chamber will be selected according to the nature of the fluid that is to be removed from the gas to be treated. The dryer of the invention can be used for removal of water (which might be in the form of water vapour, or liquid water as droplets) from a gas stream. Appropriate adsorbents might then include silica, alumina and carbon based materials, especially molecular sieve materials. Examples of other liquids that might be removed from a gas stream include organic materials, especially hydrocarbon based materials.

Preferably, the density of packing of the adsorbent in the region of the chamber in which liquid collects is lower than the density of packing in other regions of the chamber to allow liquid to collect. Generally, the said region will contain substantially no adsorbent. For example a screen can be provided in the chamber to define the region and to prevent adsorbent material from collecting in the region.

The transverse dimension of the drain tube will be selected to be as large as possible for fast drainage of the liquid from the chamber, subject to ensuring that the pressure drop across the drain tube and resulting velocity of gas leaving the chamber during depressurisation of the chamber, is sufficient to cause collected liquid to drain. Preferably, the cross-sectional area (or the average cross-sectional area if it is not constant) of the drain tube is at least about 75 $mm^2$, more preferably at least about 250 $mm^2$. Preferably, the cross-sectional area is not more than about 1000 $mm^2$.

The depth of the chamber from the bottom of the region in which liquid collects to the bottom of the depressurisation outlet will be not more than about 20 cm, more preferably not more than about 15 cm. Preferably, that depth will be at least about 3 cm, more preferably at least about 7 cm. The said depth will be approximately equal to the diameter of the chamber when it has a circular cross-section and is mounted horizontally.

The chamber can be provided with a transparent portion in its wall in the region to which the drain tube extends to admit collected liquid, to permit inspection of the quantity of liquid that has collected in the dryer in that region. The dryer can be provided with a sensor for collected liquid to generate a signal so that the level of liquid can be monitored, locally or remotely. The signal can indicate an alarm condition, for example when an undesirably large quantity of liquid has collected. This might result for example from a restriction to flow of liquid along the drain tube.

The dryer of the invention can be used in a compressed air system. The system might be used for heating and/or ventilation purposes. The system might be used in a process industry. In another aspect, the invention provides a compressed gas system which includes a gas dryer of the type discussed above.

In another aspect, the invention provides a method of removing liquid that has collected in a dryer for a compressed gas, the dryer including an inlet and an outlet for gas which is to be dried by flowing under pressure through the dryer and being mounted so that the direction of flow of gas between the inlet and the outlet is off the vertical, so that neither the inlet nor the outlet for gas to be dried is located centrally at the low point of the chamber, which comprises the steps of rapidly depressurising the chamber of the dryer through a depressurisation outlet, the chamber containing a drain tube which extends from the low point region of the chamber at which liquid has collected into the depressurisation outlet so that liquid is caused to flow into the depressurisation outlet when the chamber is depressurised.

INTRODUCTION TO THE DRAWINGS

DESCRIPTION OF PREFERRED EMBODIMENTS

Figure 1:
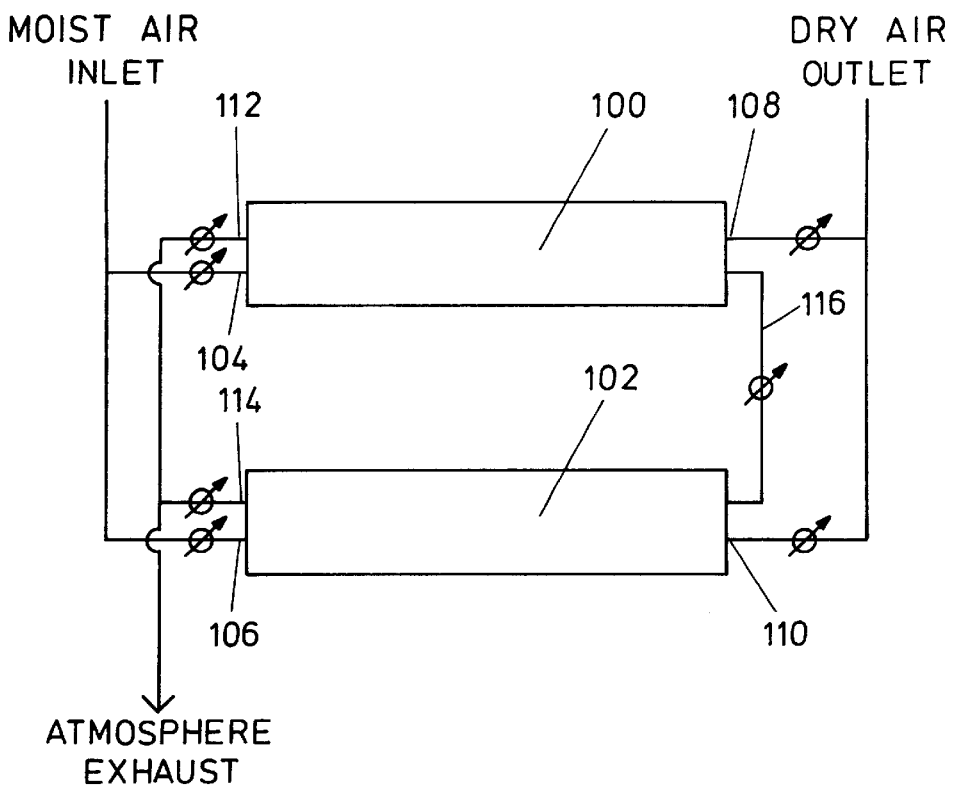
FIG. 1 is a schematic representation of a pressure swing adsorption dryer system for use in a compressed gas system.

FIG. 1 shows a dryer assembly which comprises first and second chambers 100, 102 arranged in parallel for a moist compressed gas stream to flow through them, from gas inlets 104, 106 to gas outlets 108, 110. Each chamber is hollow and contains a desiccant material.

Each chamber 100, 102 has at the inlet end a depressurisation outlet 112, 114 for purge gas.

In operation, compressed gas is supplied to the first chamber 100 through the inlet 104, the inlet 106 to the second chamber 102 being closed. As the gas flows through the chamber 100, water vapour in the compressed air is adsorbed by the desiccant. Any liquid water, either carried in the compressed air or which has condensed on a surface within the chamber, collects in the chamber. Dry air leaves the chamber 100 through the outlet 108.

The chambers are connected at the gas outlet end by means of a purge gas connector 116 which takes a part of the output of dry air from the chamber through which compressed air is flowing and passes it to the other chamber. When it is the first chamber 100 to which moist air is supplied, the inlet 106 to the second chamber is closed and a part of the output of dry air from the first chamber is supplied to the second chamber through the purge gas connector 116. As it flows through the second chamber, leaving through the depressurisation outlet 114, it desorbs moisture on the desiccant within the second chamber.

The dryer is operated cyclically. When the desiccant in the first chamber has to be regenerated and the desiccant in the second chamber has been regenerated, the inlet to the first chamber, the dry gas outlet from the first chamber, and the depressurisation outlet from the second chamber are closed. The inlet to the second chamber, the dry gas outlet from the second chamber, and the depressurisation outlet from the first chamber are then opened. Gas then flows through the second chamber and is dried therein, and a part of the dry gas from the second chamber flows through the first chamber to dry the desiccant therein.

Figure 2:
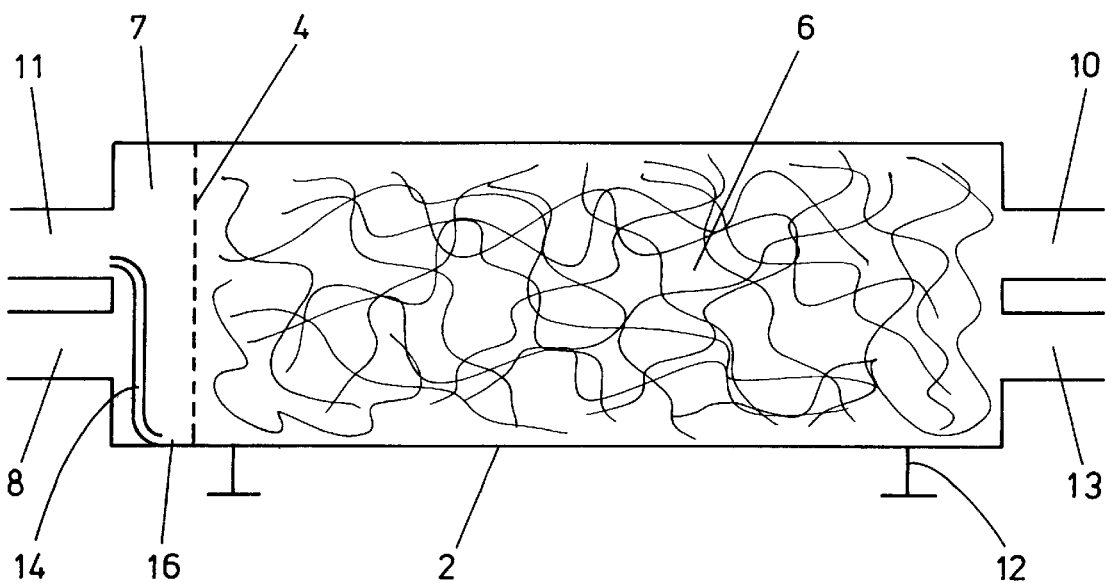
FIG. 2 is a sectional elevation through a dryer as used in the dryer system shown in FIG. 1.

FIG. 2 shows a chamber which might be used in the system shown in FIG. 1. The illustrated chamber 2 is substantially cylindrical and with a substantially circular cross-section. The length of the chamber is about 30 cm and its diameter is about 15 cm. The chamber contains a desiccant material 6 consisting of activated alumina. A screen 4 is provided at one end of the chamber to keep the desiccant out of the region 7 of the chamber between the screen and the end of the chamber.

A gas inlet 8 is provided at one end of the chamber and a gas outlet 10 at the opposite end. The gas inlet and outlet are located in the end faces of the chamber. Each has a cross-sectional area of about 6 cm$^2$. A depressurisation outlet 11 with a valve is provided in the same end of the chamber as the gas inlet, and a purge gas inlet 13 is provided at the same end of the chamber as the gas outlet.

The chamber includes brackets 12 for mounting it for use. The brackets are arranged so that the chamber can be mounted for gas to flow horizontally from the gas inlet 8 to the outlet 10.

A drain tube 14 is provided at the end of the chamber as the gas inlet 8, within the region 7 defined by the screen 4 that is free of desiccant. A first end of the drain tube is located in a region 16 of the chamber at which liquid can collect when the dryer is mounted horizontally for use. The opposite end of the drain tube is located in the depressurisation outlet 11. The drain tube has a cross-sectional area of 3 cm$^2$.

The chamber can have a window in its wall at the end at which the first end of drain tube is located to allow inspection of the chamber to determine the quantity of liquid that has collected.

In use, during the drying part of the operating cycle, moist gas is passed through the chamber, from the gas inlet 8 to the gas outlet 10. Moisture is adsorbed from the flowing by the desiccant 6. Liquid that drains from the desiccant drains to the region 16 of the chamber which represents the low point of the chamber. Collected liquid can be viewed through the window in the side wall of the chamber.

After a pre-determined period when the desiccant 6 is required to be purged, the flow of moist gas to the chamber is cut off. The valve in the depressurisation outlet 11 is then opened allowing the pressure within the chamber to drop, from about 0.8 MPa to about 0.1 MPa, over a period of about 5 S. The flow of gas out of the chamber through the depressurisation outlet caused by this drop in pressure leads to liquid that has collected in the low point region 16 of the chamber to be drawn out of the chamber, where it is discharged from the system. Recharging of the desiccant can then involve passage of purge gas through the chamber, from the purge gas inlet 13 to the depressurisation outlet 11.

What is claimed is:

1. A gas dryer which comprises:
   (a) a chamber with an inlet and an outlet for a gas which is to be dried by flowing under pressure through the dryer, arranged so that the direction of flow of the gas is between end faces of the chamber, the location of the inlet and the outlet for gas to be dried being such that, when the chamber is mounted so that the direction of flow of gas between the inlet and the outlet is off the vertical, neither the inlet nor the outlet is arranged centrally at the low point of the chamber,
   (b) a medium in the chamber for adsorbing liquid entrained with the gas, and
   (c) a drain tube which extends from the low point region of the chamber at which liquid can collect when the dryer is mounted for use off the vertical into a depressurisation outlet through which gas leaves the chamber when the dryer is depressurised so that liquid which has collected in the said region of the chamber is discharged into the depressurisation outlet.

2. A gas dryer as claimed in claim 1, which is arranged to be mounted so that the gas to be dried flows within the chamber from the inlet to the outlet substantially horizontally.

3. A gas dryer as claimed in claim 1, in which the outlet for gas when the chamber is depressurised is the inlet for gas to be dried when the dryer is in use.

4. A gas dryer as claimed in claim 1, in which the inlet and the outlet are provided in end walls of the chamber.

5. A gas dryer as claimed in claim 1, which includes a valved outlet for fluid that is discharged into the gas depressurisation outlet from the chamber.

6. A gas dryer as claimed in claim 1, which includes means for mounting the chamber for use in such a way that the direction of flow of gas between the inlet and the outlet is off the vertical, and so that liquid collects preferentially in the low point region of the chamber from which the drain tube extends so that the liquid drains through the drain tube into the depressurisation outlet when the chamber is depressurised.

7. A gas dryer as claimed in claim 6, in which the direction of flow of gas between the inlet and the outlet is substantially horizontal.

8. A compressed gas system which includes a gas dryer as claimed in claim 1.

9. A gas dryer for removing liquid entrained with a gas, the gas dryer comprising:
   (a) an enclosed chamber having a low point region, the chamber communicating with the exterior through a gas inlet, gas outlet, and a depressurization outlet which are each positioned away from the low point region;
   (b) means disposed within the chamber for adsorbing the liquid entrained with the gas when the gas passes through the chamber between the gas inlet and the gas outlet; and
   (c) a drain tube extending from the low point region of the chamber to the depressurization outlet.

10. A gas dryer as recited in claim 9, wherein the means for adsorbing the liquid is separated from the low point region of the chamber.

11. A gas dryer as claimed in claim 1, wherein the drain tube extends within the chamber from the low point region of the chamber.

12. A gas dryer as recited in claim 9, wherein the means for adsorbing the liquid is a material selected from the group consisting of silica, alumina, carbon based materials, and molecular sieve materials.

13. A gas dryer as recited in claim 9, wherein the drain tube extends within the chamber from the low point region of the chamber to the depressurisation outlet.

* * * * *